US011105464B2

(12) United States Patent
Letscher et al.

(10) Patent No.: US 11,105,464 B2
(45) Date of Patent: Aug. 31, 2021

(54) DEVICE FOR SUPPLYING LUBRICANT TO A VEHICLE SYSTEM

(71) Applicant: Deere & Company, Moline, IL (US)

(72) Inventors: Jens Letscher, Ludwigshafen (DE); Florian Reinmuth, Sinsheim (DE)

(73) Assignee: DEERE & COMPANY, Moline, IL (US)

( * ) Notice: Subject to any disclaimer, the term of this patent is extended or adjusted under 35 U.S.C. 154(b) by 415 days.

(21) Appl. No.: 15/632,366

(22) Filed: Jun. 25, 2017

(65) Prior Publication Data

US 2018/0017210 A1 Jan. 18, 2018

(30) Foreign Application Priority Data

Jul. 18, 2016 (DE) .......................... 102016213102.8

(51) Int. Cl.
*F16N 29/02* (2006.01)
*F16N 7/38* (2006.01)
*B60R 17/02* (2006.01)

(52) U.S. Cl.
CPC .............. *F16N 29/02* (2013.01); *B60R 17/02* (2013.01); *F16N 7/385* (2013.01); *F16N 2210/04* (2013.01); *F16N 2270/70* (2013.01)

(58) Field of Classification Search
CPC ...... F16N 29/02; F16N 7/385; F16N 2270/70; F16N 2210/04
See application file for complete search history.

(56) References Cited

U.S. PATENT DOCUMENTS

| | | | |
|---|---|---|---|
| 3,985,205 A | 10/1976 | Hedlund et al. | |
| 5,195,612 A | 3/1993 | Hahn et al. | |
| 5,381,874 A | 1/1995 | Hadank et al. | |
| 5,482,138 A * | 1/1996 | Mori ........................ | E02F 9/00 184/6 |
| 9,458,965 B2 * | 10/2016 | Kile ........................ | F16N 29/02 |
| 2008/0110698 A1 | 5/2008 | Hammes | |
| 2011/0253481 A1* | 10/2011 | Lin ........................ | F16N 11/08 184/108 |

(Continued)

FOREIGN PATENT DOCUMENTS

| | | |
|---|---|---|
| DE | 20113362 U1 | 1/2002 |
| DE | 102006053093 A1 | 5/2008 |

(Continued)

OTHER PUBLICATIONS

German Search Report issued in counterpart application No. 102016213102.8 dated Apr. 11, 2018. (10 pages).

(Continued)

*Primary Examiner* — Michael R Mansen
*Assistant Examiner* — Mark K Buse

(57) ABSTRACT

A device for supplying lubricant to a vehicle system includes a lubricant pump for supplying fluid from a lubricant reservoir and a lubricant distributor having a plurality of individually drivable supply valves configured for injecting a lubricant into lubricating points of associated operating components. The device also includes a controlling device for operably controlling the supply valves to lubricate the operating components based upon a lubricant demand or lubricant consumption related to operational information of the operating components.

12 Claims, 1 Drawing Sheet

(56) References Cited

U.S. PATENT DOCUMENTS

| | | | | |
|---|---|---|---|---|
| 2012/0247876 | A1* | 10/2012 | Kreutzkamper | F16N 7/385 184/26 |
| 2013/0015019 | A1 | 1/2013 | Kuvaja et al. | |
| 2016/0041086 | A1* | 2/2016 | Jacques | G01N 19/02 184/6.1 |
| 2016/0186811 | A1* | 6/2016 | Conley | F16N 29/02 184/6.1 |

FOREIGN PATENT DOCUMENTS

| | | | |
|---|---|---|---|
| DE | 102008043143 | B3 | 1/2010 |
| DE | 102011007125 | A1 | 2/2014 |
| EP | 2198194 | B1 | 5/2013 |
| GB | 2155417 | A | 9/1985 |
| JP | H10237897 | A | 9/1998 |
| JP | 2005090597 | A | 4/2005 |
| WO | 2006084752 | A1 | 8/2006 |
| WO | WO2014001375 | A1 | 1/2014 |
| WO | WO2016099257 | A1 | 6/2016 |

OTHER PUBLICATIONS

European Search Report issued in counterpart application No. 17181235.7 dated Oct. 9, 2017. (7 pages).
European Opposition issued in counterpart application No. 17181235.7 dated Dec. 20, 2019 (390 pages).
Translation of Fig. 9 JPH10237897A.
European Opposition in counterpart application No. 17181235.7 documents dated Dec. 20, 2019 through Feb. 3, 2021 (746 pages).
European Opposition in European application No. 17181235.7 documents dated Jul. 5-14, 2021 (45 pages).

* cited by examiner

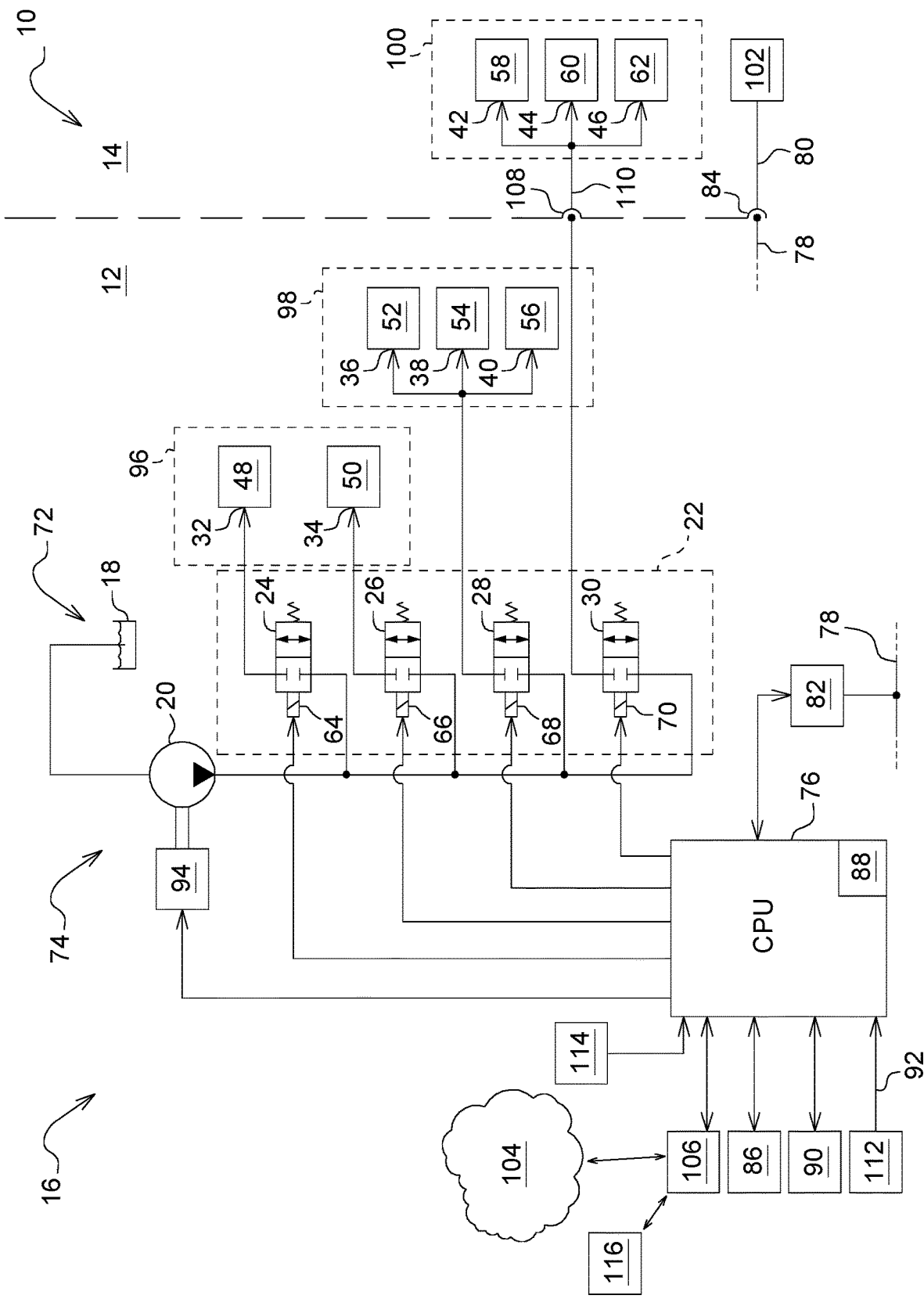

DEVICE FOR SUPPLYING LUBRICANT TO A VEHICLE SYSTEM

RELATED APPLICATIONS

This application claims the benefit of German Application Ser. No. 102016213102.8, filed on Jul. 18, 2016, the disclosure of which is hereby expressly incorporated by reference in its entirety.

FIELD OF THE DISCLOSURE

The present disclosure relates to a device for supplying lubricant to a vehicle system, and in particular to a device for supplying lubricant to a vehicle system including a lubricant pump and a lubricant distributor which exhibits a plurality of individually drivable supply valves for injecting a lubricant into lubricating points of associated operating components.

BACKGROUND

A device of such a type in the form of a central lubrication system for an industrial vehicle is known from JP 2005090597 A, for example. The central lubrication system includes a hydraulically controllable supply of lubricating oil and also a distribution means which on the output side is connected to a plurality of operating components of the industrial vehicle which are to be lubricated. For the purpose of implementing a lubricating process, a push-button switch arranged on a hand lever has to be actuated, whereupon, by an associated electric valve being closed, a punch encompassed by the system for supplying lubricating oil is pressurized hydraulically in such a manner that lubricating oil flows out of a piston chamber of the system for supplying lubricating oil in the direction of the distribution means and hence in the direction of the operating components to be lubricated.

Such a central lubrication system finds application in connection with, amongst other things, operating components having so-called total-loss lubrication, in which in the course of re-lubrication the contaminated lubricant is displaced and conducted away to the outside at an appropriate point of the operating component. The re-lubrication is conventionally undertaken by hand, by the lubricant being applied by means of a grease gun via an associated lubricating point of the operating component. The known lubrication system relieves the operator from the implementation of this time-consuming maintenance measure.

SUMMARY

In one embodiment of the present disclosure, a device for supplying lubricant to a vehicle system includes a lubricant pump, fed from a lubricant reservoir, and a lubricant distributor which exhibits a plurality of individually drivable supply valves for injecting a lubricant into lubricating points of associated operating components. Moreover, a controlling device is present which drives the supply valves for the purpose of lubricating the operating components in accordance with a lubricant demand or lubricant consumption derived from operational information pertaining to the operating components.

In other words, not only is an automated lubrication, and hence a lubrication that is independent of the arbitrary action of an operator, undertaken for each of the operating components; what is more, by consideration of the actual lubricant demand or lubricant consumption it is possible to prevent an undersupply or oversupply of lubricant, which ultimately leads to a premature wear of the operating components or, respectively, to an undesirable contamination of the environment with lubricant that has been released in excess. This also holds especially with regard to a use of biodegradable lubricants which by their nature have a shorter useful life in comparison with conventional lubricants and necessitate a more frequent re-lubrication of the operating components.

The vehicle system takes the form of, for example, an agricultural vehicle/implement pairing which consists of a tractor and also an accessory implement or ancillary implement mounted thereon. A plurality of operating components for implementing associated work functions have been assigned both to the tractor and to the accessory implement or ancillary implement. These operating components, provided with a total-loss lubrication, are typically hydraulic cylinders, motors, gear mechanisms and bearings.

The operational information pertaining to the operating components is available, in particular, on an ISOBUS data network of the tractor, inclusive of a network extension extending to the accessory implement or ancillary implement, and can be read out there by the controlling device via an associated ISOBUS interface. An assignment of the operational information that has been read out by the controlling device to a particular operating component is undertaken in this case by concomitant transmission of corresponding identification data to the controlling device.

If it is a question of an accessory implement or ancillary implement lacking ISOBUS capability, the operational information can also be derived from actuating signals of a hydraulic or electric system for controlling the accessory implement or ancillary implement, which is provided in the tractor.

The lubricant demand or lubricant consumption of the respective operating component results either as a consequence of a loss of lubricant, arising in operation-dependent manner, or alternatively by reason of lubrication intervals to be complied with in maintenance-dependent manner. The operational information therefore relates to the operating time of the respective operating component that has elapsed since the last lubrication, or to the operation-dependent degree of utilization thereof, inclusive of load peaks arising where appropriate. The operation-dependent degree of utilization results, for example, from the frequency or duration with which the operating component is actuated within a certain period of time.

In this case, for the purpose of assessing the necessity of lubrication the controlling device can perform a comparison of the operating time of the respective operating component that has elapsed since the last lubrication, or of the operation-dependent degree of utilization thereof, with threshold values specific to the respective operating component which have been stored in a memory unit encompassed by the controlling device. The threshold values specific to the respective operating component have been predetermined by the manufacturer; additionally, however, a configuration by an operator via a user interface connected to the controlling device, or an adaptation as a function of the lubricant being used, may also be conceivable in which case the threshold values in the case of a biodegradable lubricant have to be set correspondingly lower.

If the controlling device establishes, by evaluation of the operational information, that the threshold values specific to the respective operating component have been exceeded, said controlling device brings about the lubrication of the respective operating component by closing the associated supply valve and starting up the lubricant pump.

Additionally or alternatively, the operating components may have been subdivided into functional groups provided for implementing assigned work functions, in which case the controlling device brings about a lubrication of the operating components of a particular functional group if by evaluation of the operational information by reason of a preceding use of the associated operating components said controlling device infers a loss of lubricant which is to be compensated. In other words, the lubrication of the operating components is undertaken in groups, whereby for the purpose of assessing the necessity of lubrication the controlling device can draw upon the frequency or duration with which the associated work functions are carried out within a certain period of time. If said frequency or duration exceeds a threshold value specific to the respective functional group, the controlling device brings about the lubrication of the functional group in question by closing the associated supply valves and starting up the lubricant pump.

In this connection the controlling device can drive the supply valves in such a manner that the lubrication of the operating components is undertaken with a quantity of lubricant adapted to the preceding use of the respective operating component. The quantity of lubricant to be injected is typically ascertained empirically for the work function or functional group in question and can, in particular together with the associated specific threshold value, be configured by an operator via the user interface connected to the controlling device. Additionally, an adaptation of the specific threshold value or of the quantity of lubricant as a function of the lubricant being used is conceivable.

To the extent that work functions or functional groups of the accessory implement or ancillary implement are concerned, the specific threshold values or quantities of lubricant to be injected, which have been provided in this respect, may have been stored in the form of corresponding data records in the memory unit encompassed by the controlling device. In this case, the selection of the appropriate data record in the case of an accessory implement or ancillary implement having ISOBUS capability can be undertaken automatically by a communication to the controlling device of identification data with respect to the model of implement being undertaken in the course of connecting the network extension of the accessory implement or ancillary implement to the ISOBUS data network of the tractor. Also possible is the use of a transponder assigned to the accessory implement or ancillary implement, which sends the identification data via an RFID data-transmission link or Bluetooth data-transmission link to a receiving device connected to the controlling device. Alternatively, the appropriate data record can also be selected manually via the user interface connected to the controlling device.

In the case of an accessory implement or ancillary implement having ISOBUS capability, or in the case where use is being made of an RFID data-transmission link or Bluetooth data-transmission link, additionally a concomitant communication of the operating-time accumulated in the course of the last operation of the accessory implement or ancillary implement, or of the operation-dependent degree of utilization, can be undertaken, in order to take this into account when assessing the lubricant demand or lubricant consumption in the course of subsequent operation.

The data records are available, for example, in an external database or data cloud which the controlling device can access in wireless manner via a GSM interface or UMTS interface. Accordingly, it is possible, in particular, that in the course of the attachment of an accessory implement or ancillary implement having ISOBUS capability that has not been utilized hitherto the controlling device downloads, on the basis of the identification data received for the model of implement in question, the appropriate data record from the external database or data cloud and stores it in the memory unit, so that said data record is available in the event of a repeated use of the same model of implement.

Moreover, a lubricant coupler communicating with the lubricant distributor may have been provided, at which the operating components of the accessory implement or ancillary implement, i.e., a supply-pipe system communicating with said components, can be separately connected fluidically to the lubricant distributor. The lubricant coupler has ordinarily been mounted in the spatial vicinity of a control-valve block located in the rear region or front region of the tractor, to which hydraulic couplers encompassed by the accessory implement or ancillary implement can be attached. Said hydraulic couplers are connected to hydraulically operated assemblies for implementing associated work functions of the accessory implement or ancillary implement.

Moreover, there is the possibility that the lubrication of the operating components can be brought about manually via a user interface connected to the controlling device. Among other things, this is an advantage when in the course of the cleaning of the vehicle system by means of a high-pressure cleaner the lubricant is washed out of the operating components and necessitates a re-lubrication.

In this case it is possible that the lubrication is undertaken merely for operating components of a functional group that is capable of being selected manually via the user interface, or alternatively for all operating components independently of their affiliation to a particular functional group. A waste of lubricant can be largely avoided in this way, since the re-lubrication can be restricted to the operating components affected by the cleaning.

In order, within the scope of the implementation of maintenance work, to be able to detect a case of damage to the operating components having its origin in a lack of lubricant, there is the possibility, furthermore, that the controlling device registers a temporal filling-level progression of the lubricant reservoir and also documents said filling-level progression by storing associated filling-level information in readable manner in the memory unit encompassed by the controlling device.

Furthermore, the controlling device can relay data concerning the compliance with lubrication intervals predetermined by the manufacturer concerning configurations by an operator, and also concerning the operating components affected by a lack of lubricant to a data-communications interface for wireless communication to a data center. For instance, a contractor can detect critical operating states by reason of an improper lubrication in good time and can rectify them in the workshop by recall of the vehicle system. An improved operational analysis of the operating components for the purpose of identifying possible causes of damage in the course of the implementation of maintenance work is also possible.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1 is an embodiment of a device for supplying lubricant to a vehicle system.

DETAILED DESCRIPTION

In FIG. 1, a vehicle system may take the form of an agricultural vehicle and implement combination 10 which includes a tractor 12 and an accessory implement or ancillary implement 14 mounted thereon.

The device 16 for supplying lubricant, which is arranged in the tractor 12, includes a lubricant pump 20, fed from a lubricant reservoir 18, and a lubricant distributor 22 which exhibits a plurality of individually drivable supply valves 24-30 for injecting a lubricant into lubricating points 32-46 of associated operating components 48-62. The supply valves 24-30 of the lubricant distributor 22 take the form of magnetic valves which can be switched over between an open and a closed position by supply of current to an associated solenoid 64-70. In representative manner, four supply valves 24-30 for supplying a total of eight operating components 48-62 with lubricant are represented, but it may also be a question of any other number.

According to the example, the operating components 48-60 have been assigned both to the tractor 12 and to the accessory implement or ancillary implement 14. The operating components 48-60 are provided with a so-called total-loss lubrication, in the case of which in the course of re-lubrication the contaminated lubricant is displaced and conducted away to the outside at an appropriate point of the respective operating component 48-60. The operating components 48-60 are typically hydraulic cylinders, gear mechanisms, motors and bearings.

The lubricant reservoir 18 in the present case is constituted by a hydraulic-oil sump 72 which is a component part of a hydraulic system 74 of the tractor 12. The hydraulic system 74 serves for supplying hydraulic oil to diverse hydraulically operated assemblies of the tractor 12, inclusive of a control-valve block arranged in the rear region or front region, to which hydraulic couplers encompassed by the accessory implement or ancillary implement 14 can be attached. Said hydraulic couplers are connected to hydraulically operated assemblies for implementing associated work functions of the accessory implement or ancillary implement 14. For reasons of clarity, the hydraulically operated assemblies of the tractor 12 and also the control-valve block together with hydraulic couplers attached thereto are not represented.

Moreover, the device 10 exhibits a microprocessor-controlled controlling device 76 which drives the supply valves 24-30 for the purpose of lubricating the operating components 48-62 in accordance with a lubricant demand or lubricant consumption derived from operational information pertaining to the operating components 48-62.

The operational information pertaining to the operating components 48-62 is available on an ISOBUS data network 78 of the tractor 12, inclusive of a network extension 80 extending to the accessory implement or ancillary implement 14, and can be read out there by the controlling device 76 via an associated ISOBUS interface 82. An assignment of the operational information that has been read out by the controlling device 76 to a particular operating component 48-62 is undertaken in this case by concomitant transmission of corresponding identification data to the controlling device 76. The network extension 80 assigned to the accessory implement or ancillary implement 14 has in this case been separably connected to the ISOBUS data network 78 of the tractor 12 via an ISOBUS plug connector 84 (ISOBUS breakaway connector).

If it is a question of an accessory implement or ancillary implement 14 lacking ISOBUS capability, the controlling device 76 derives the operational information from actuating signals of a hydraulic or electric accessory-implement or ancillary-implement control system 86 which is provided in the tractor 12.

The lubricant demand or lubricant consumption of the respective operating component 48-62 results either as a consequence of a loss of lubricant arising in operation-dependent manner or alternatively by reason of lubrication intervals to be complied with in maintenance-dependent manner. The operational information therefore relates to the operating-time of the respective operating component 48-62 that has elapsed since the last lubrication, or to the operation-dependent degree of utilization thereof, inclusive of load peaks arising where appropriate. The operation-dependent degree of utilization in this case results from the frequency or duration with which the operating component 48-62 is actuated within a certain period of time.

For the purpose of assessing the necessity of lubrication, the controlling device 76 performs a comparison of the aforementioned quantities with threshold values specific to the respective operating component 48-62 which have been stored in a memory unit 88 encompassed by the controlling device 76. The threshold values specific to the respective operating component 48-62 have been predetermined by the manufacturer but can additionally be configured by an operator via a user interface 90 connected to the controlling device 76, so that an individual adaptation is possible as needed. The user interface 90 is a touch-sensitive screen which communicates with the controlling device 76 via a CAN data bus 92 of the tractor 12.

If the controlling device 76 establishes, by evaluation of the operational information, that the threshold values specific to the respective operating component 48-62 have been exceeded, said controlling device brings about the lubrication of the respective operating component 48-62 by closing the associated supply valves 64-70 and starting up the lubricant pump 20 by supplying current to an electric pump motor 94.

The operating components 48-62 have optionally been subdivided into functional groups 96, 98, 100 provided for implementing assigned work functions, the controlling device 76 bringing about a lubrication of the operating components 48-62 of a particular functional group 96, 98, 100 if by evaluation of the operational information by reason of a preceding use of the associated operating components said controlling device infers a loss of lubricant which is to be compensated.

In other words, the lubrication of the operating components 48-62 is undertaken in groups, whereby for the purpose of assessing the necessity of lubrication the controlling device 76 draws upon the frequency or duration with which the associated work functions are carried out within a certain period of time. If said frequency or duration exceeds a threshold value specific to the respective functional group 96, 98, 100, the controlling device 76 brings about the lubrication of the operating components 48-62 encompassed by the functional group 96, 98, 100 by closing the supply valves 64-70 in question and starting up the lubricant pump 20 by supplying current to the electric pump motor 94.

All the operating components involved in the implementation of a particular work function consequently form a common functional group. Merely for the purpose of illustration, the two following examples will be mentioned:

| Work function | Functional group-operating components affected |
|---|---|
| Loading work by means of a front-end loader mounted on the tractor | Drive train of the tractor, positioning elements (hydraulic cylinders) of the front-end loader |
| Mowing work by means of a mower mounted on a front power lift or rear power lift of the tractor | Drive train of the tractor, positioning elements (hydraulic cylinders) of the front power lift or rear power lift, drive assemblies of the mower |

As can be discerned, within the scope of various work functions the same operating components may have been allocated to several functional groups simultaneously.

In this case the controlling device 76 drives the supply valves 64-70 in such a manner that the lubrication of the operating components 48-62 is undertaken with a quantity of lubricant adapted to the preceding use of the respective work function. The quantity of lubricant to be injected is ascertained empirically for the work function or functional group 96, 98, 100 in question and, together with the associated specific threshold value, can be configured by an operator via the user interface 90 connected to the controlling device 76.

To the extent that work functions or functional groups 96, 98, 100 of the accessory implement or ancillary implement 14 are concerned, the specific threshold values or quantities of lubricant to be injected, which have been provided in this respect, have been stored in the form of corresponding data records in the memory unit 88 encompassed by the controlling device 76, the selection of the appropriate data record being undertaken automatically in the case of an accessory implement or ancillary implement 14 having ISOBUS capability, by a communication to the controlling device 76 of identification data with respect to the model of implement being undertaken by a job computer 102 in the course of connecting the network extension 80 of the accessory implement or ancillary implement 14 to the ISOBUS data network 78 of the tractor 12. Alternatively, the appropriate data record is selected manually via the user interface 90 connected to the controlling device 76.

The data records are available in an external database or data cloud 104 which the controlling device 76 can access in wireless manner via a GSM interface or UMTS interface 106, whereby in the course of the attachment of an accessory implement or ancillary implement 14 having ISOBUS capability that has not been utilized hitherto the controlling device 76 downloads, on the basis of the identification data received for the model of implement in question, the appropriate data record from the external database or data cloud 104 and stores it in the memory unit 90, so that said data record is available in the event of a repeated use of the same model of implement.

According to the example, a lubricant coupler 108 is provided, at which the operating components 58-62 of the accessory implement or ancillary implement 14, i.e., a supply-pipe system 110 communicating with said operating components, can be separably connected fluidically to the lubricant distributor 22. The lubricant coupler 108 has been mounted in the spatial vicinity of the control-valve block located in the rear region or front region of the tractor 12. The state of attachment is monitored by means of a coupling sensor 112 connected to the controlling device 76, whereby upon detection of an imperfectly established coupling connection a lubrication of the operating components 58-62 assigned to the accessory implement or ancillary implement 14 does not occur. For the sake of clarity, merely a solitary lubricant coupler 108 is represented, but separate lubricant couplers are in fact provided both in the rear region and in the front region of the tractor 12, so that at least two accessory implements or ancillary implements capable of being mounted on the tractor 12 can be supplied with lubricant.

Additionally, the lubrication of the operating components 48-62 can be brought about manually via the user interface 90 connected to the controlling device 76. Amongst other things, this is an advantage when in the course of the cleaning of the tractor 12 or of the accessory implement or ancillary implement by means of a high-pressure cleaner the lubricant is washed out of the operating components 48-62 and necessitates a re-lubrication.

In this case the lubrication is undertaken merely for operating components 48-62 of a functional group 96, 98, 100 that is capable of being selected manually via the user interface 90, or alternatively for all operating components 48-62 independently of their affiliation to a particular functional group 96, 98, 100. A waste of lubricant can be largely avoided in this way, since the re-lubrication can be restricted to the operating components 48-62 affected by the cleaning.

In order, within the scope of the implementation of maintenance work, to be able to detect a case of damage to the operating components 48-62 having its origin in a lack of lubricant, the controlling device 76 registers a temporal filling-level progression of the lubricant reservoir 18 and documents said filling-level progression by storing associated filling-level information in readable manner in the memory unit 88 encompassed by the controlling device 76. The provision of the filling-level information is undertaken by means of a filling-level sensor 114 encompassed by the hydraulic system 74.

Furthermore, the controlling device 76 relays data concerning the compliance with lubrication intervals predetermined by the manufacturer, concerning configurations by an operator, and also concerning the operating components 48-62 affected by a lack of lubricant, to the GSM interface or UMTS interface 106 for wireless communication to a data center 116. For instance, a contractor can detect critical operating states by reason of an improper lubrication in good time and can rectify them in the workshop by recall of the agricultural vehicle/implement pairing 10. An improved operational analysis of the operating components 48-62 for the purpose of identifying possible causes of damage in the course of the implementation of maintenance work is also possible.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A device for supplying lubricant to a vehicle system, comprising:
   a lubricant pump for supplying fluid from a lubricant reservoir;

a lubricant distributor comprising a plurality of individually drivable supply valves configured for injecting a lubricant into lubricating points of associated operating components; and a controlling device for operably controlling the supply valves to lubricate the operating components based upon a lubricant demand or lubricant consumption related to operational information of the operating components received via a data network;

wherein the operating components are subdivided into functional groups provided for implementing assigned work functions;

wherein the controlling device operably lubricates the operating components of only a particular functional group via supply valves if by evaluation of the operational information by reason of a preceding use of the associated operating components of the particular functional group the controlling device infers a loss of lubricant which is to be compensated based upon an operating-time of the respective operating components of the particular functional group that has elapsed since a previous lubrication, which exceeds a threshold value specific to the particular functional group; and wherein the operating-time of the particular functional group is different from another functional group.

2. The device of claim 1, wherein the controlling device drives the supply valves such that the lubrication of the operating components of the particular functional group is undertaken with a quantity of lubricant adapted to the preceding use of the respective operating components of the particular functional group.

3. The device of claim 1, wherein the lubrication is undertaken for operating components of the particular functional group that is manually selectable via a user interface connected to the controlling device.

4. The device of claim 1, wherein the lubrication is undertaken for all operating components independently of their affiliation to the particular functional group.

5. The device of claim 1, wherein the controlling device operably registers a temporal filling-level progression of the lubricant reservoir based upon a filling-level sensor and documents the filling-level progression by storing associated filling-level information in a readable manner in a memory unit of the controlling device.

6. The device of claim 1, wherein the controlling device is configured to relay data related to the compliance with predetermined lubrication intervals, configurations by an operator, and the operating components affected by a lack of lubricant, the controlling device communicating the data to a data-communications interface for wireless communication to a data center.

7. A vehicle system, comprising:

a plurality of operating components to be lubricated; and a device for supplying lubricant to a vehicle system, the device including a lubricant pump for supplying fluid from a lubricant reservoir, a lubricant distributor comprising a plurality of individually drivable supply valves configured for injecting a lubricant into lubricating points of associated operating components, and a controlling device for operably controlling the supply valves to lubricate the operating components based upon a lubricant demand or lubricant consumption related to operational information of the operating components received via a data network;

wherein the operating components are subdivided into functional groups provided for implementing assigned work functions; and wherein the controlling device operably lubricates the operating components of only a particular functional group via one of the plurality of individually drivable supply valves if by evaluation of the operational information by reason of a preceding use of the associated operating components of the particular functional group the controlling device infers a loss of lubricant which is to be compensated based upon an operating-time of the respective operating components of the particular functional group that has elapsed since a previous lubrication, which exceeds a threshold value specific to the particular functional group; and wherein the operating-time of the particular functional group is different from another functional group.

8. The vehicle system of claim 7, wherein the controlling device drives the supply valves such that the lubrication of the operating components of the particular functional group is undertaken with a quantity of lubricant adapted to the preceding use of the respective operating components of the particular functional group.

9. The vehicle system of claim 7, wherein the lubrication is undertaken for operating components of the particular functional group that is manually selectable via a user interface connected to the controlling device.

10. The vehicle system of claim 7, wherein the lubrication is undertaken for all operating components independently of their affiliation to the particular functional group.

11. The vehicle system of claim 7, wherein the controlling device operably registers a temporal filling-level progression of the lubricant reservoir based upon a filling-level sensor and documents the filling-level progression by storing associated filling-level information in a readable manner in a memory unit of the controlling device.

12. The vehicle system of claim 7, wherein the controlling device is configured to relay data related to the compliance with predetermined lubrication intervals, configurations by an operator, and the operating components affected by a lack of lubricant, the controlling device communicating the data to a data-communications interface for wireless communication to a data center.

* * * * *